(12) United States Patent
Bass et al.

(10) Patent No.: US 6,658,584 B1
(45) Date of Patent: Dec. 2, 2003

(54) METHOD AND STRUCTURE FOR MANAGING LARGE COUNTER ARRAYS

(75) Inventors: Brian Mitchell Bass, Apex, NC (US); Gordon Taylor Davis, Chapel Hill, NC (US); Marco C. Heddes, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 09/656,556

(22) Filed: Sep. 6, 2000

(51) Int. Cl.[7] .............................................. G06F 1/04
(52) U.S. Cl. ............................. 713/502; 714/1; 714/25; 714/47
(58) Field of Search ............................. 713/502; 714/1, 714/25, 47

(56) References Cited

U.S. PATENT DOCUMENTS

| | | | | |
|---|---|---|---|---|
| 5,414,704 A | * | 5/1995 | Spinney | 370/389 |
| 5,446,560 A | | 8/1995 | Schwartz | 358/445 |
| 5,471,640 A | | 11/1995 | McBride | 395/842 |
| 5,615,135 A | * | 3/1997 | Waclawsky et al. | 702/182 |
| 5,687,173 A | | 11/1997 | Melden et al. | 370/395 |
| 5,784,554 A | | 7/1998 | Hsiung | 395/183.21 |
| 5,790,625 A | | 8/1998 | Arimilli | 377/54 |
| 5,991,708 A | * | 11/1999 | Levine et al. | 702/186 |
| 6,052,708 A | * | 4/2000 | Flynn et al. | 709/108 |
| 6,360,337 B1 | * | 3/2002 | Zak et al. | 714/47 |
| 6,519,330 B2 | * | 2/2003 | Goto et al. | 379/133 |

* cited by examiner

*Primary Examiner*—Thomas Lee
*Assistant Examiner*—Michael Nieves
(74) *Attorney, Agent, or Firm*—Driggs, Lucas, Brubaker & Hogg

(57) ABSTRACT

A method and structure for counting and storing the number of occurrences of each of a plurality of events occurring in a processor complex, which processor complex has at least one processor which processes multiple groups of data in a multiplicity of ways, is provided. The structure includes multiple storage devices, each of which includes a plurality of arrays of memory storage for storing count information of each event, which arrays are divided into a plurality of separately addressable groups of memory addresses in each memory array. At least one counter element is associated with each array of memory. A table is provided which contains information, including a point of reference in each array to uniquely define the structure and location of each memory array. At least one processor generates a plurality of parameters for each of the events to uniquely identify the event. A counter manager is provided which communicates with said at least one processor through its associated coprocessors and receives the parameters of each event generated from the at least one processor. The counter manager, utilizing the table and the parameters information from the at least one processor determines the unique physical address location associated with the event, reads the data from the unique address, modifies the read data according to the instructions and writes the modified data to the determined address. The invention also contemplates reading the information which has been stored for statistical evaluation at the address without modifying the stored information.

26 Claims, 4 Drawing Sheets

| Parameter | Bits | Definition |
|---|---|---|
| Counter Definition Table Index | 8 | Which Counter Definition Entry should be used for this action |
| Counter Block Index | 20 | Which set of counters should be referenced |
| Counter Number | 4 | Which counter within the set should be referenced |
| Action | 3 | What action should be performed on the counter<br><br>Modify<br>    000- Increment by 1<br>    001- Add 16 bits to counter<br>Read<br>    100- Standard read<br>    101- Read then Clear value<br>Write<br>    110- Write bits 15:0 of counter<br>    111- Write bits 31:16 of counter<br>All other code points are reserved |
| Add/Write Value | 16 | Value to add to counter when Modify/Add selected<br>value to write to counter when Write selected |

Fig 2

| BaseAddr | MemNr | 40/24 Bit | NrOfCounters | 64 Bit Field | |
|---|---|---|---|---|---|
| | | | | | 31 |

⋮

| | | | | | |
|---|---|---|---|---|---|
| | | | | | 5 |
| | | | | | 4 |
| | | | | | 3 ← CritBlockDefIndex |
| | | | | | 2 |
| | | | | | 1 |
| | | | | | 0 |
| 20 bits | 3 bits | 1 bit | 5 bits | 1 bit | |

Fig 3

METHOD AND STRUCTURE FOR MANAGING LARGE COUNTER ARRAYS

BACKGROUND OF THE INVENTION

1. Field of the Invention

This invention relates generally to a method and structure for managing large counter arrays and, more particularly, to coprocessors and their use by counter managers for managing large counter arrays. In even more particular aspects, this invention relates to managing the counting of a large number of individual events in a computer network system where large volumes of information are being passed, such as, for example, in a communications network wherein at times there are a large number of packets of information containing a great number of bits being passed in a very short period of time from multiple input ports to multiple output ports.

2. Background Art

While the invention is not so limited, it is especially useful in communication network systems where large volumes of frames or packets of information are passed from port to port and it is necessary to statistically evaluate the system based on the traffic volume through each port and with the traffic volume between various ports, the number of packets of various sizes of information which are delivered or discarded and other information relating to the operation of the network system. One particular network system of this type is shown and described in U.S. patent application Ser. No. 09/544,896, filed Apr. 7, 2000, entitled Network Processor/Software Control Architecture, the contents of which are incorporated herein by reference as if they were fully set forth. In this type of system, data frames are received at one port from an external source such as a computer, processed and delivered from the incoming port to the required destination port. These incoming ports and destination ports may be on the same blades or different blades and the various statistical information such as that noted above needs to be accumulated. One technique for accumulating the statistical information is to count the number of occurrences of the various events, such as data entry through a specific port, data exit through a specific port, traffic between specific ports, discarded data the size of the frames, and other characteristics of the data and store each of these counts in some type of memory.

Prior art techniques for storing such information utilize the internal processors within the communication system to manage the counting of events. This imposes a significant additional burden on the processors within the system, making the system less efficient than it could be if this task were not required of the internal processors.

SUMMARY OF THE INVENTION

According to the present invention, a method and structure for counting and storing the number of occurrences of each of a plurality of events occurring in a processor complex, which processor complex has at least one processor which processes multiple groups of data in a multiplicity of ways, is provided. The structure includes multiple storage devices, each of which includes a plurality of arrays of memory storage for storing count information of each event, which arrays are divided into a plurality of separately addressable groups of memory addresses in each memory array. At least one counter element is associated with each array of memory. A table is provided which contains information, including a point of reference in each array to uniquely define the structure and location of each memory array. At least one processor generates a plurality of parameters for each of the events to uniquely identify the event. A counter manager is provided which communicates with said at least one processor through its associated coprocessors and receives the parameters of each event generated from the at least one processor. The counter manager, utilizing the table and the parameters information from the at least one processor determines the unique physical address location associated with the event, reads the data from the unique address, modifies the read data according to the instructions and writes the modified data to the determined address. The invention also contemplates reading the information which has been stored for statistical evaluation at the address without modifying the stored information.

DESCRIPTION OF THE DRAWINGS

FIG. 2 is a table showing the parameters, the number of bits in each parameter and the definition of each parameters which is used to perform the necessary operations in a counter array;

FIG. 3 is a table showing the information in the counter manager to combine with the parameters passed as shown in Table 2 to form an address for the counted event, and the operation that is to be performed on the counted event.

DESCRIPTION OF THE PREFERRED EMBODIMENTS

According to the present invention, a method and structure for counting and storing the number of occurrences of each of a plurality of events in a communication system generally of the type shown in said application Ser. No. 09/544,896 is shown. It is to be understood, however, that this is just one illustration of how the method and structure for counting can be used and it has use not only in other communications systems but in other types of systems where large amounts of data are being passed and various events associated with the passing of the data need to be analyzed.

The system disclosed in application Ser. No. 09/544,896 provides a number of blades each receiving input information on a plurality of ports on each blade from external devices, such as computers, determining the destination of such information, and transmitting the data out of a port associated with the destination device. (This output port could be on the same blade or on another blade, depending upon which blade has the output port connected to the desired external device) In order to statistically analyze the operation of this system, it is necessary to collect the number of occurrences of various different types of events that occur within the communications systems and record each occurrence of these events and retrieve this recorded information for statistical purposes. It is to be understood that the system, as shown in application Ser. No. 09/544,896, has a very large number of occurrences of events, as well as a very large number of different events that are desired to be recorded. For example, and only as an example, the number of packets of information being delivered to a given port may be recorded as well as the number of packets of information of various size being delivered to a particular port or that are dispatched from a particular port or the number of occurrences of information going from one specific port to another. Also, it may be desirable to record the number of packets either generally or by packet size of information that is discarded, rather than being transmitted. Many other types of occurrences can also be recorded, the only requirement is that these occurrences be capable of being monitored by the communication system and parameters generated which are unique to that event and will allow the calculation of a unique address from the parameters to describe the event as will be described presently.

The large number of occurrences as well as the large number of different kinds of occurrences and locations of these occurrences requires a very extensive memory system for recording each type of occurrence and, thus, it requires a large number of counter locations for such recording. The present invention provides a scheme and architecture for recording this large variety of different occurrences and large number of occurrences efficiently and effectively without putting an undue burden on the communication system.

Figure 1:
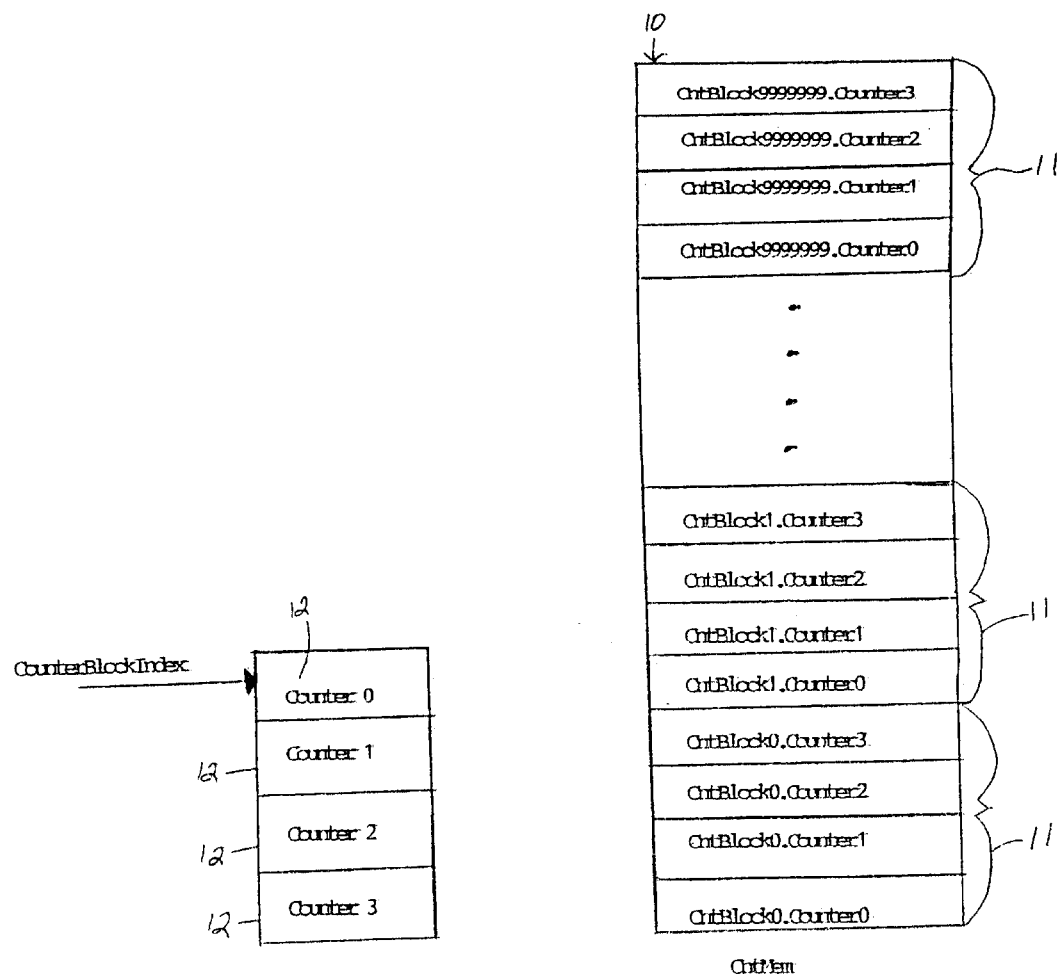
FIG. 1 is a diagrammatic representation of an addressing scheme according to the present invention for a memory array.

To this end, a counter manager is provided which includes a number of counter block arrays, one of which arrays is shown and designated as reference character 10 in FIG. 1. The different arrays may be different physical memories, or may be separate locations within a given physical memory, or a combination of both.

Each counter block array is divided into a number of groups of addresses or counter blocks 11 for storing count information, as will be explained presently. These address blocks are designated as counter block 0, counter block 1 . . . counter block 99999. Each counter block, as depicted in FIG. 1, has four address locations corresponding to the number of counters 12. These are designated in FIG. 1 as counter block 0 counter 0, counter block 0 counter 1, counter block 0 counter 2, counter block 0 counter 3, counter block 1 counter 0, counter block 1 counter 0, counter block 1 counter 1, counter block 1 counter 2, counter block 1 counter 3 . . . counter block 99999 counter 0, counter block 99999 counter 1, counter block 99999 counter 2, and counter block 99999 counter 3. In the scheme as shown in FIG. 1, this particular counter block has four counters, counter 0, counter 1, counter 2 and counter 3, although a different number of counters can be provided, as will be described presently. In such a case, the number of counter or address blocks 11 in each group of addresses is equal to the number of counters 12. The number of counters 12 can vary from one array to another array, although with the particular addressing scheme, there must be the same number of counters in each set within a specific counter array 10, i.e., there cannot be a different number of counters for each block within a single array. However, there can be a different number of counters in a different array 10.

To address a specific counter within the counter array 10 shown in FIG. 1, three parameters are necessary. The first parameter is the number of the counter block group within the array to be accessed, which will indicate one of particular counter blocks 11 that is used; the second is the particular counter, i.e. counter 0, counter 1, counter 2, or counter 3, and the third is the base addresses of the given array 10. This will designate which counter block address within each group 11 is being addressed. For example, if counter block 1 is being addressed, this provides a possibility of four different counter addresses. Thus, if counter 0 within this counter block 1 is designated, this provides but a single final address, i.e. counter block 1 counter 0. Each of these individual address locations within the counter block 10 is adapted to store an updated count of the number of occurrences of any selected event which is to be stored at that particular location. Thus, with this type of addressing scheme, a large number of locations are available to store an updated count of the number of occurrences with any one of a very large number of events.

Table 2 shows the parameters that are generated to uniquely identify the particular counter array and the address location within a particular counter array 10 in which the number of particular events is to be stored. The parameters provide information which can be decoded as to which counter array 10 is to be used to store the information, the counter block group 11 in which this is to be stored, and the counter number 12 to uniquely identify the position within the counter block group of addresses. With these three parameters, the individual location in the correct counter block array is identified, which is unique to the particular event the counts of which are being stored. The parameters also include other information, such as what action should be performed on the counter; for example, it could be a read, it could be a write or it could be a read modify write, or any other type of operation. Also, there may be occasions in which the counter is to be modified in some other way other than by incrementing by one and this particular action is also controlled by the parameters. For example, the action might be decrement rather than increment or an increment or decrement by a value other than one. It is also possible to have flow control actions determined by the parameters generated. It is to be understood an addressing scheme for the various counter arrays 10 can be employed, such that the counter definition table that selects the particular counter array in which the address is found, can be designated by the counter definition table index. The most significant bits of the counter memory address are derived from the entry in this table which corresponds to the counter definition table index. As indicated above, all of these parameters are generated within the processor array and passed to the counter manager, the operation of which will be described presently.

FIG. 3 shows a table contained within the counter manager which allows the counter manager to receive the parameters generated in Table 2 and locate the proper specific address within the proper counter array and perform the indicated operations. The table includes the base or starting address for each counter array which, in the present scheme, includes the most significant bits of the address to identify the counter array. The other information in the table includes bits to select physical memory in which it is located, the type of counter, e.g. 64 bit or 32 bit counter, and the setting of the 64 bit counter when 64 bit counter is present. When a 64 bit counter is present, two fields containing different information can be used, one field of 40 bits, the other of 24 bits. Also, the number of counters within each counter block are designated. (in the preferred embodiment, the number of counters in each counter block are limited to power of 2, e.g., 1, 2, 4, 8, 16, . . . etc.) As can be seen, there is shown the possibility of 32 different counter arrays based on the table index given. The table index will provide a base address for entry into the counter array as well as the number of counters per counter set. According to this scheme then, the final unique address can be determined with the following equation:

The final unique address=the base address+(counter set index× number of counters per set)+counter number.

Thus, with the parameters passed from the table shown in FIG. 2 and with the use of the information shown in Table 3, the address uniquely identified within the array is quickly and easily identified. The action to be taken can then be performed which, if it's a write operation will include a read of the data at that particular address location modifying the data (normally incremented by one) and rewriting the modified data to that location. If it's a read only operation, the data is merely read and not modified and may either be returned to the location or the data can be cleared and the counter locator reset to zero. Other actions can also be taken.

Thus, with this particular scheme of operation each accuracy of an event can be easily identified and recorded in a unique address and used for statistical information and control.

Figure 4:
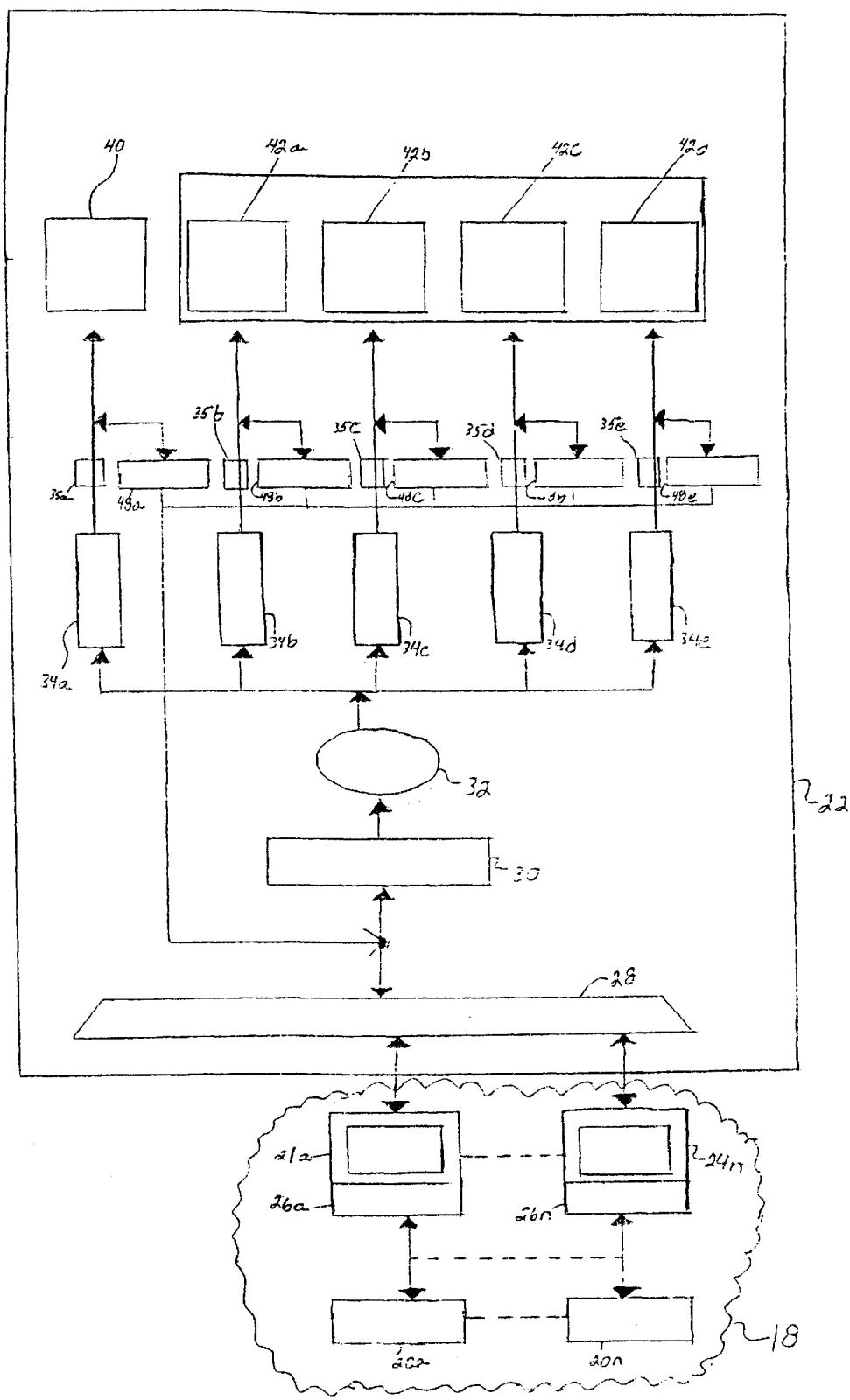
FIG. 4 is a block diagram showing the operation of the counter manager to perform read and write operations based on the information in table 3 and the parameters passed by Table 2.

The architecture to implement this technique of recording events previously described is shown in FIG. 4. As can be seen in FIG. 4, a communication system is designated generally as 18 which can be of the type described in patent application Ser. No. 09/544,896. The communication system 18 includes a number of processors or processing elements, sometimes referred to a PICO processors 20a . . . 20n. The communication system 18 includes a plurality of coprocessors 21a . . . 21n which are connected to a counter manager 22 which will count the number of each of various events that occur under the control of processors 20a . . . 20n. (The counter manager preferably is physically located within the communication system 18, but is shown separately for illustrative purposes). The coprocessors 21a . . . 21n are connected to the processors 20a . . . 20n and receive the information to identify each type of event which processors 20a . . . 20n have performed. The coprocessors 21a . . . 21n each have a FIFO buffer 26a . . . 26n for buffering the information from the processors 20a . . . 20n. The coprocessors 21a . . . 21n based on the receipt of the information from the processors 20a . . . 20n will receive the parameters listed in Table 2 and deliver them to an arbitrator/multiplexor 28 within the counter manager 22. The operation of the coprocessors 21a . . . 21n is described in application Ser. No. 09/548,109, filed Apr. 12, 2000, for "Coprocessor Structure and Method for a Communications System Network Processor". Preferably, and in its simplest form, the arbitrator/multiplexor is simply a round robin polling logic for polling in turn each of the coprocessors 21a . . . 21n to provide an output to counter block definition memory 30.

The counter block definition memory 30 includes the table shown in FIG. 3 as well as logic and from this table and the information received from the arbitrator/multiplexor 28 generates the address to be written based on the calculation shown above for the address, and delivers this address as the counter queue parameters 32. The counter queue parameters 32 are delivered to the proper queue control 34a, 34b, 34c, 34d, and 34e depending on the memory ID field in the table of FIG. 3, at which the proper counter queue control selects the proper address within either an internal memory 40 or one of the addresses in an DRAM chip 42a, 42b, 42c or 42d. Logic circuitry 35a, 35b, 35c, 35d, and 35e is provided to perform the read/modify/write operation on the data from the requested address location. The physical separation of the memory devices is independent of the logical partition into various memory arrays 10. Thus, one DRAM on the internal memory could hold multiple memory arrays 10. The proper manipulation of the data is then performed and data is either rewritten or discarded as the particular function dictates. If a read function is to be performed, read logic 48 is addressed which will read the information at the generated address and return the contents of the specified counter with the option, however, of clearing the counter content.

Thus, it can be seen with the present counter manager scheme, the various events that take place within the communication system 18 can be monitored, counted and stored in a unique address location in memory and read from this location all under the control of the counter manager 22 and coprocessor 21a . . . 21n which are separate from the processors 20a . . . 20n of the system, thus freeing these processors 20a . . . 20n up from having to perform counting functions, and allowing them to perform their main tasks of guiding traffic in the system 18.

The preferred embodiment of the present invention has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A method of counting and storing the number of occurrences of each of a plurality of events occurring in a processor complex, which processor complex has at least one processor which processes multiple groups of data in a multiplicity of ways comprising the steps of:

providing a plurality of arrays of memory storage for storing count information of each event;

providing a plurality of separately addressable groups of memory addresses in each array of memory;

providing at least one counter associated with each array of memory;

providing a table which contains information including a point of reference in each array to uniquely define the structure and location of each array of memory;

said at least one processor generating a plurality of parameters for each of said events to uniquely identify each said event;

providing a counter manager communicating with said at least one processor and said memory arrays;

passing the parameters of each said event generated by said at least one processor to said counter manager;

said counter manager, utilizing said table and said parameters of information from said at least one processor, determining the unique physical address location associated with said event, reading the data from said determined address, modifying the read data and writing the modified data to the said determined addresses.

2. The invention of claim 1 wherein there are a plurality of processors in said processor complex and wherein the counter manager includes an arbitration scheme for arbitrating between said processors for access to the counter manager.

3. The invention of claim 1 wherein said counter manager communicates with said at least one processor through at least one coprocessor.

4. The invention of claim 1 wherein one of said parameters for each event includes a counter definition table index which identifies the counter definition entry to be used for a particular action.

5. The invention as defined in claim 4 wherein one of said parameters for each of said events is a counter index and wherein there are a plurality of counters associated with each counter definition entry.

6. The invention as defined in claim 1 wherein one of said parameters for each of said events includes the action to be performed by the counter.

7. The invention as defined in claim 1 further characterized by periodically reading the data at each of said addresses.

8. The invention as defined in claim 1 further characterized by said parameters including a counterset index, the number of counters per set and the counter number to be used for a particular address.

9. The invention as defined in claim 8 wherein a base address for each counter array is stored in said table as a starting point of reference.

10. The invention as defined in claim 9 wherein the address to be accessed is determined by the formula address to be accessed=base address+(counter set index×number of counters per set)+counter number.

11. The invention as defined in claim 1 wherein the step of modifying the data includes incrementing the read value by 1.

12. The invention as defined in claim 1 wherein the step of modifying the data includes decrementing the read value by 1.

13. The invention as defined in claim 1 wherein the step of modifying the data includes modifying the data in different ways in different segments of the data.

14. A structure for managing the counting and storing the number of occurrences of each of a plurality of events occurring in a processor complex, which processor complex has at least one processor which processes multiple groups of data in a multiplicity of ways comprising:

a plurality of arrays of memory storage for storing count information of each event;

a plurality of separately addressable groups of memory addresses in each array of memory;

at least one counter associated with each array of memory;

a table which contains information including a point of reference in each array to uniquely define the structure and location of each array of memory;

said at least one processor having logic to generate a plurality of parameters for each of said events to uniquely identify each said event;

a counter manager communicating with said at least one processor and said memory arrays;

circuitry for passing the parameters of each of said event generated by said at leas tone processor to said counter manager;

said counter manager including logic to utilize said table and said parameters of information from said at least one processor to determine the unique physical address location associated with said event, to read the data from said determined address, to modify the read data and to write the modified date to the said determined addresses.

15. The structure of claim 14 wherein there are a plurality of processors in said processor complex and wherein the counter manager includes an arbitration device for arbitrating between said processors for access to the counter manager.

16. The structure of claim 14 wherein said counter manager communicates with said at least one processor through at least one coprocessor.

17. The structure of claim 14 wherein one of said parameters for each event includes a counter definition table index which identifies the counter definition entry to be used for a particular action.

18. The invention as defined in claim 17 wherein one of said parameters for each of said events is a counter index and wherein there are a plurality of counters associated with each counter definition entry.

19. The invention as defined in claim 14 wherein one of said parameters for each of said events includes the action to be performed by the counter.

20. The invention as defined in claim 14 further characterized by logic to periodically read the data at each of said addresses.

21. The invention as defined in claim 14 further characterized by said parameters including a counterset index, the number of counters per set and the counter number to be used for a particular address.

22. The invention as defined in claim 21 wherein a base address for each counter array is stored in said table as a starting point of reference.

23. The invention as defined in claim 22 wherein there is logic to deliver the address to be accessed by the formula base address+(counter set index×number of counters per set)+counter number.

24. The invention as defined in claim 14 wherein the logic for modifying the data includes logic to increment the read value by 1.

25. The invention as defined in claim 14 wherein the logic for modifying the data includes logic to decrement the read value by 1.

26. The invention as defined in claim 14 wherein the logic for modifying the data includes logic to modify the data in different ways in different segments of the data.

* * * * *